(12) United States Patent
Hagerskans

(10) Patent No.: US 12,311,896 B2
(45) Date of Patent: May 27, 2025

(54) BRAKE SYSTEM FOR AN AUTONOMOUS VEHICLE

(71) Applicant: Volvo Autonomous Solutions AB, Gothenburg (SE)

(72) Inventor: Jonas Hagerskans, Landvetter (SE)

(73) Assignee: Volvo Autonomous Solutions AB, Gothenburg (SE)

(*) Notice: Subject to any disclaimer, the term of this patent is extended or adjusted under 35 U.S.C. 154(b) by 367 days.

(21) Appl. No.: 17/759,809

(22) PCT Filed: Feb. 7, 2020

(86) PCT No.: PCT/EP2020/053066
§ 371 (c)(1),
(2) Date: Jul. 29, 2022

(87) PCT Pub. No.: WO2021/155945
PCT Pub. Date: Aug. 12, 2021

(65) Prior Publication Data
US 2023/0066117 A1    Mar. 2, 2023

(51) Int. Cl.
*B60T 13/38* (2006.01)
(52) U.S. Cl.
CPC ......... *B60T 13/385* (2013.01); *B60T 2201/00* (2013.01); *B60T 2270/413* (2013.01)
(58) Field of Classification Search
None
See application file for complete search history.

(56) References Cited

U.S. PATENT DOCUMENTS

| | | |
|---|---|---|
| 2005/0029864 A1 | 2/2005 | Bauer et al. |
| 2006/0225971 A1 | 10/2006 | Jaeger |
| 2009/0184568 A1 | 7/2009 | Bensch et al. |
| 2015/0019101 A1 | 1/2015 | Bajorat |
| 2018/0052463 A1 | 2/2018 | Mays |
| 2018/0362013 A1 | 12/2018 | Ungermann |

FOREIGN PATENT DOCUMENTS

| | | |
|---|---|---|
| CN | 101070784 A | 11/2007 |
| CN | 101117115 A | 2/2008 |
| CN | 101397046 A | 4/2009 |
| CN | 101622164 A | 1/2010 |
| CN | 101801745 A | 8/2010 |
| CN | 103423141 A | 12/2013 |

(Continued)

OTHER PUBLICATIONS

DE-102017007780-A1—English Machine Translation (Year: 2019).*

(Continued)

*Primary Examiner* — Melanie Torres Williams
(74) *Attorney, Agent, or Firm* — Venable LLP; Jeffri A. Kaminski

(57) ABSTRACT

A brake system in a vehicle includes a brake circuit arranged to contain pressurized brake fluid; a parking brake acting on at least one wheel of the vehicle, the parking brake connected to the brake circuit and configured to be engaged when the pressure in the brake circuit is below a threshold pressure; and at least two evacuation valves, each configured to evacuate pressurized brake fluid from the brake circuit in response to a control signal, for thereby engaging the parking brake.

13 Claims, 3 Drawing Sheets

(56) References Cited

FOREIGN PATENT DOCUMENTS

| CN | 109677382 A | 4/2019 | |
|---|---|---|---|
| DE | 102007016335 A1 | 10/2008 | |
| DE | 102008063952 A1 * | 6/2010 | ............ B60T 13/263 |
| DE | 102017007780 A1 * | 2/2019 | ............ B60T 13/385 |
| EP | 2055541 A1 * | 5/2009 | ............ B60T 13/385 |
| EP | 2055541 B1 | 3/2013 | |
| WO | 2017157500 A1 | 9/2017 | |
| WO | 2019030242 A1 | 2/2019 | |
| WO | 2019091726 A1 | 5/2019 | |
| WO | WO-2019210956 A1 * | 11/2019 | ............ B60T 13/268 |
| WO | 2019233977 A1 | 12/2019 | |

OTHER PUBLICATIONS

DE-102008063952-A1—English Machine Translation (Year: 2010).*
EP-2055541-A1—English Machine Translation (Year: 2009).*
International Search Report and Written Opinion in corresponding International Application No. PCT/EP2020/053066 (14 pages).
Chinese Notice of Grant dated Sep. 2, 2024 in corresponding Chinese Patent Application No. 202080094766.4, 6 pages.
Chinese Office Action dated Jan. 4, 2024 in corresponding Chinese Patent Application No. 202080094766.4, 18 pages.
Chinese Office Action dated May 20, 2024 in corresponding Chinese Patent Application No. 202080094766.4, 17 pages.

* cited by examiner

BRAKE SYSTEM FOR AN AUTONOMOUS VEHICLE

CROSS-REFERENCE TO RELATED APPLICATIONS

This application is a U.S. National Stage application of PCT/EP2020/053066, filed Feb. 7, 2020 and published on Aug. 12, 2021, as WO 2021/155945, all of which is hereby incorporated by reference in its entirety.

TECHNICAL FIELD

The present disclosure relates to the field of vehicular technology and in particular to a brake system with improved reliability that may be suitable for autonomous vehicles (AVs).

BACKGROUND

Automatically triggered emergency braking is an important safety feature in AVs, by which that the onboard emergency stop controller is able to bring the AV to a halt if an unsafe or abnormal condition is discovered. For redundancy purposes, it has been proposed to use the parking brake system of the vehicle for the emergency stop if the service brake system is or appears to be inoperable. For example, the normal functioning of the emergency stop controller in an emergency braking state may be to initially engage the service brake and, once the vehicle speed is less than a threshold, to engage the parking brake and neutral gear. However, if the service brake is unresponsive for a predefined time (e.g., as judged based on the absence of an expected acknowledgement signal or a deceleration measurement), the controller further engages the parking brake.

In conventional (i.e., driver-operated) vehicles, a parking brake system is considered safe if it reliably maintains an engaged state; much less attention is directed to unsuccessful engagement of the parking brake, as this is normally noted by the driver. In an arrangement of the type outlined above, however, where the parking brake is used as a final resort, a failure of the parking brake system may be fatal. Accordingly, there is a need for a parking brake system with a more reliable engagement behavior.

SUMMARY

In view of the foregoing, one objective of the present disclosure. is to make available a brake system with improved reliability compared to the prior art. A further objective is to make available a more reliable method of engaging a parking brake. These and other objectives are achieved by the invention defined by the independent claims.

In a first aspect, a brake system in a vehicle comprises a brake circuit, which is arranged to contain pressurized brake fluid, and a parking brake acting on at least one wheel of the vehicle. The parking brake is connected to the brake circuit and configured in such manner that it is engaged when the pressure in the brake circuit is below a threshold pressure. For example, the parking brake may comprise a resilient or preloaded member tending to urge two surfaces together into frictional contact so as to dissipate kinetic energy, and a pressure-actuated member tending to oppose the resilient member by separating the surfaces when the brake fluid in the brake circuit is pressurized. Conditions in which the pressure in the brake circuit is below the threshold pressure typically includes leakage, which leads to partial or complete evacuation of the brake fluid. According to the first aspect of the invention, the brake system further comprises at least two evacuation valves, each of which is configured to evacuate pressurized brake fluid from the brake circuit in response to a control signal, for thereby engaging the parking brake.

The fact that the brake system has two or more evacuation valves and each of these is able to engage the parking brake on its own provides redundancy. The failure probability of the total evacuating functionality of the brake system is thereby decreased to the square (in the case of two evacuation valves) of the failure probability of one isolated evacuation valve. This provides a more reliable engagement behavior of the parking brake and may render the brake system suitable for use in an AV.

In an embodiment, the evaluation valves are supplied with a common control signal and each evacuation valve operates independently of the other evacuation valve(s) in response to the control signal. This way, the brake system is easy to integrate with conventional components adapted for actuation of a brake system with just one evacuation valve. In particular, the redundancy is obtained without any need to duplicate the control signal.

In an embodiment, each of the evacuation valves is actuated by a respective solenoid, and an energized state of the solenoid corresponds to an open state of the evacuation valve. This behavior can be achieved by arranging a resilient or preloaded member in the solenoid, the evacuation valve or a connecting element therebetween. In particular, the control signal may be a winding current of the solenoids by which the solenoids are energized. By this arrangement, the valves will be normally closed, so that an emergency stop controller must actively request the braking. This makes it possible to inactivate the emergency stop functionality of the vehicle temporarily if, for example, the vehicle is going to be driven by a human driver on a public road, where surrounding traffic does not expect the vehicle to be emergency stopped. More generally, this embodiment may help reduce the risk of inadvertent engagement of the parking brake as a result of an electric failure interrupting the electric connection of a solenoid. It may also reduce wear and thereby extend the life cycle of the solenoids.

In an alternative embodiment, each of the evacuation valves is actuated by a solenoid whose energized state corresponds to a closed state of the evacuation valve. This implies that the evacuation valve will instead be normally open, so that the emergency stop controller must actively close the evacuation valves when the emergency stop is not desired. An advantage is that the stopping functionality is preserved in the event of, say, an electric failure in a solenoid connection and/or a software execution failure in the emergency stop controller. In this sense, the emergency stop controller may be considered passively safe.

In a further development of these embodiments, a common winding current may be applied to all solenoids and drained from each solenoid via a respective ground connection line. If the solenoids are connected at branches of a common electric supply line, it is convenient to apply a common winding current. Because each solenoid has its own ground connection line, the ability to engage the parking brake is preserved even if one of the ground connection lines is interrupted.

In an embodiment, the brake system further comprises an emergency stop controller which is configured to generate said control signal to the evacuation valves. The control signal may be generated by detecting predefined conditions using one or more sensors, in response to manual activation input from a local or remote user of an AV, in response to a site-wide activation input carried by a broadcast or propagated wireless signal, or the like. The emergency stop controller may serve as an interface towards other sections of the vehicle's control system and may further be configured to coordinate different braking modalities of the braking system.

Such emergency stop controller may be configured to receive an activation input ordering an emergency stop of the vehicle, and, after a predetermined delay from receipt of the activation input, set the control signal to an active state. During the predetermined delay, the emergency stop controller may attempt to activate a primary braking modality. As one example, the emergency stop controller may be further configured to activate a service brake of the vehicle upon receipt of the activation input. The parking brake—which is then the secondary braking modality—is activated after the predetermined delay has elapsed.

In a further development of this embodiment, the emergency stop controller comprises an override mechanism configured to apply a zero delay in response to receiving an indication of a service brake failure. The indication may originate from a self-check functionality of the service brake or other diagnostic functionality of the brake system. The undelayed activation of the parking brake in such conditions may save valuable time.

In a second aspect, there is provided a vehicle comprising the brake system of any of the preceding claims. The vehicle may be an AV.

In a third aspect, there is provided a method for engaging a parking brake acting on at least one wheel of a vehicle. In the vehicle, the parking brake is connected to a brake circuit and is configured to be engaged when the pressure of brake fluid contained in the brake circuit is below a threshold pressure. According to the third aspect, a control signal is applied to at least two evacuation valves, each configured to evacuate pressurized brake fluid from the brake circuit in response to said control signal. By providing the control signal to two evacuation valves, each sufficient to engage the parking brake, provides redundancy-based safety.

The method may be implemented in an emergency stop controller of the vehicle. The vehicle may be an AV.

Generally, all terms used in the claims are to be interpreted according to their ordinary meaning in the technical field, unless explicitly defined otherwise herein. In particular, the term "brake circuit" is used to refer to a system of connected receptacles, piping etc. for containing pressurized brake fluid without requiring its topology or geometry to be circular, closed or the like. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully with reference to the accompanying drawings, on which certain embodiments of the invention are shown. These aspects may however be embodied in many different forms and should not be construed as limiting; rather, these embodiments are provided by way of example so that this disclosure will be thorough and complete, and to fully convey the scope of the invention to those skilled in the art.

Figure 1:
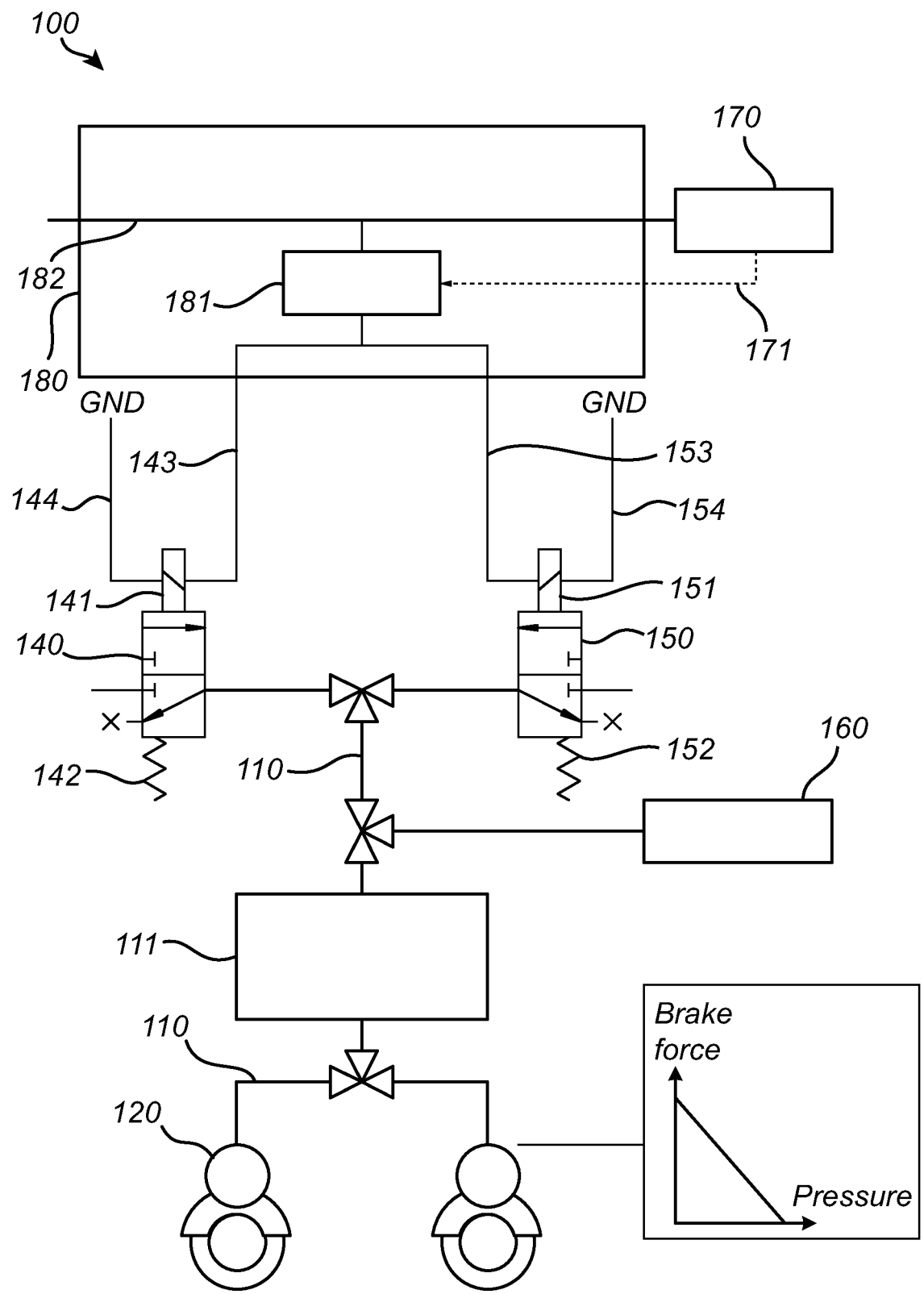
FIG. 1 is a block diagram of a brake system in a vehicle.
Figure 3A:
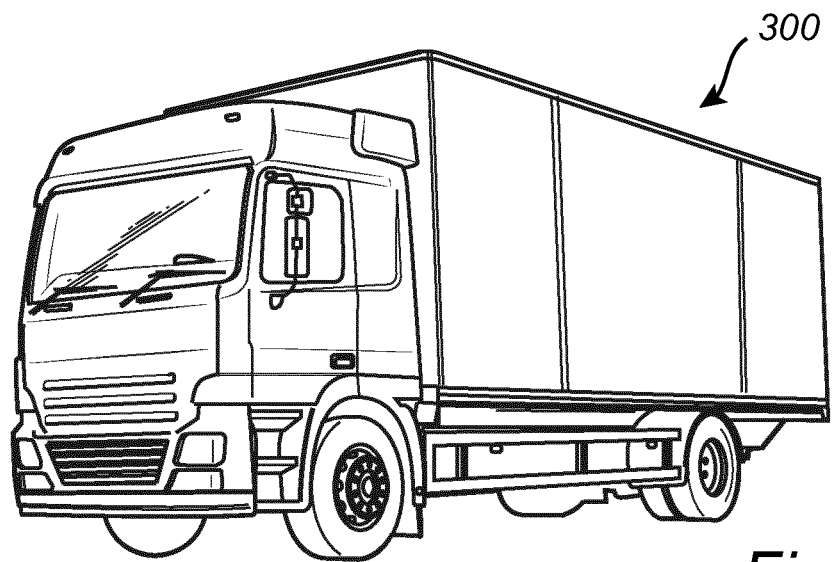
FIG. 3 depicts example vehicles in which the present invention may be implemented.
Figure 3B:
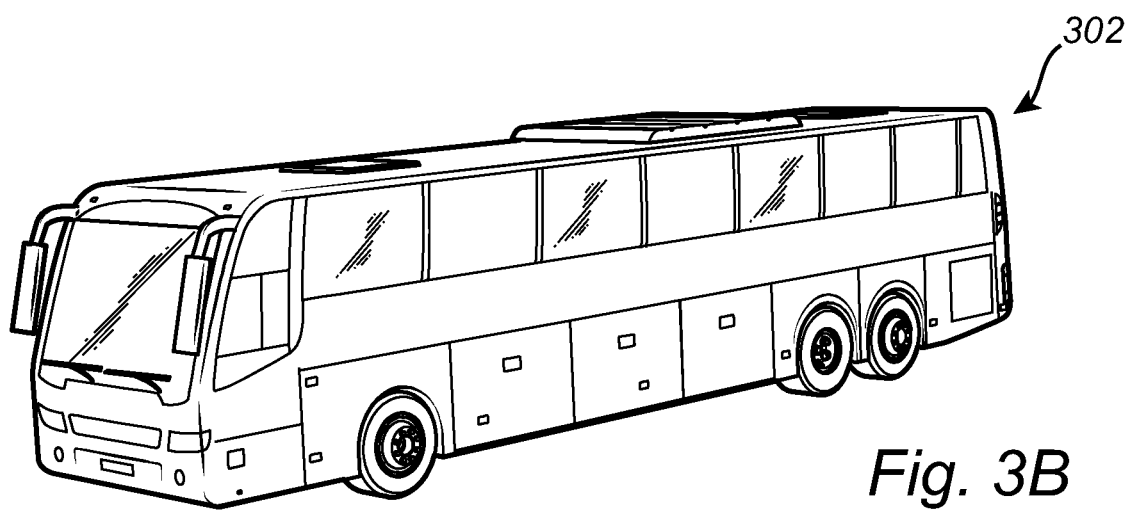
Figure 3C:
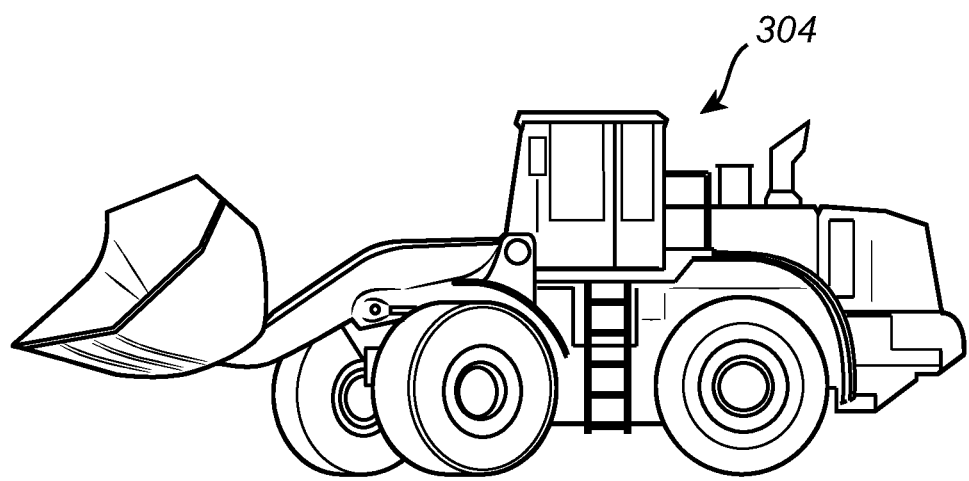

FIG. 1 is a generalized block diagram of a brake system 100 with a service brake 170 and a parking brake 120. The brake system 100 may be installed in a road vehicle, such as a car or a heavy-duty vehicle, e.g., a truck 300, a bus 302 or construction equipment 304 (see FIG. 3). The brake system 100 may alternatively be installed in a railway vehicle.

The brake system 100 comprises a brake circuit 110, which in operation contains pressurized brake fluid, for controlling the parking brake 120. In the example implementation shown in FIG. 1, the brake fluid is pressurized air. In other implementations within the scope of the invention, hydraulic oil or another suitable liquid or gaseous fluid may be used. The pressurized air is supplied by an air production module (APM) in which connects to an upper or lower portion of the brake circuit 110. The APM 111 may comprise a pump or compressor (not shown) adapted to pressurize atmospheric air, which has optionally been preconditioned by mechanical filtering and/or dehydration. The APM 111 may supply the pressurized air at a setpoint pressure, to the brake circuit 110 and optionally to more components of the vehicle.

While FIG. 1 shows an APM 111 with two connections to the portions of the brake circuit 110, it is to be understood that the APM 111 allows air to flow freely between the upper and lower portion of the brake circuit, so that the respective pressures in the upper and lower portions will equilibrate in a few seconds or even faster. For example, the upper and lower portions of the brake circuit 110 may be connected to a common reservoir (not shown) within the APM 111. As an alternative to the topology shown in FIG. 1, the APM 111 may be connected to one single point on the brake circuit 110.

The portion of the brake circuit 110 located below the APM 111 in FIG. 1 leads up to a parking brake 120 acting on one or more of the wheels of the vehicle. The parking brake 120 may be a disc brake that is preloaded by a resilient member (not shown), such as a spring. With this structure, there will be an inverse relationship between braking force and pressure in the brake circuit 110, as suggested by the simplified plot in the lower right-hand side of the figure: increasing the pressure will tend to disengage the parking brake 120. The parking brake 120 may alternatively be another type of frictional brake or a magnetic brake, in either case preloaded in such manner that it is engaged when the brake circuit pressure falls below a threshold pressure. The value of the threshold pressure may depend on combined characteristics of the parking brake 120 and the resilient member, and possible further factors.

The portion of the brake circuit 110 located above the APM 111 leads up to two evacuation valves 140, 150, which are actuated by a respective solenoid 141, 151. The brake system 100 may comprise a greater number of evacuation valves 140, 150 than two; this is a design choice related to the desired level of reliability. In the illustrated example embodiment, each evacuation valve 140, 150 is returned to its closed position by a resilient member, shown symbolically as a spring 142, 152. As long as a solenoid 141, 151 is unenergized, therefore, the corresponding valve 140, 150 stays closed and maintains the pressurized brake fluid inside the brake circuit 110. As already mentioned, another option is to use evacuation valves that stay open as long as they are unenergized. Returning to the illustrated embodiment, each evacuation valve 140, 150 (as symbolized by arrows with purely exemplifying directions) in its open position, allows brake fluid to leave the brake circuit 110. Because the brake circuit 110 is above atmospheric pressure in normal operation, air will escape to the left through the left evacuation valve 140 and to the right through the right evacuation valve 150, as seen in the plane of the drawing. This will cause the pressure in the entire brake circuit 110 to drop, so that the parking brake 120 is engaged.

The rate at which the brake circuit 110 pressure drops depends on the flow capacity of the evacuation valves 140, 150, as well as dimensions of the piping and connectors which form the brake circuit 110. It will be within the abilities of the skilled person to assign values to these and similar parameters, by balancing requirements for responsive braking and for safeguards against wheel locking as may result from too sudden braking. Also the characteristics of the APM 111 may influence the pressure drop rate when the evacuation valves 140, 150 are open. During braking, indeed, the APM 111 should preferably be blocked from replenishing the brake circuit 111 (e.g., temporarily disconnected, temporarily inactivated). As a safeguard against a failure to block the APM 111, the pressurizing capacity of the APM 111 may be chosen significantly lower than the flow rate through an open evacuation valve 140, 150; this makes the APM 111 unable to neutralize an intended braking attempt by replenishing the brake circuit 110.

The upper portion of the brake circuit 110 furthermore comprises a connection towards a trailer brake module 160. The trailer brake module 160 may have a similar inverse relationship between the brake circuit pressure and the braking force. Therefore, opening the valves 140, 150 will cause the wheels of the trailer to be braked as well.

In the uppermost part of FIG. 1, there is shown an emergency stop controller 180 configured to supply the solenoids 141, 151 with control signals 143, 153 in response to an activation input 182 indicating an order for an emergency stop of the vehicle. In the illustrated example implementation, the control signals 143, 153 are winding currents of the solenoids 141, 151. The windings of both solenoids 141, 151 are fed from a common current source corresponding to the T-shaped branching point where the segments 143 and 153 meet. The solenoids 141, 151 have mutually separate ground connection lines 144, 154 for draining the current. A grounding failure normally will therefore only affect one of the solenoids 141, 151.

The emergency stop controller 180 is configured to execute an emergency stop order using the service brake 170 primarily. More precisely, a delay stage 181 ensures that the activation input 182 is passed on to the solenoids 141, 151 only after a predetermined delay, such as 2 seconds. The delay stage 181 may be configured to pass on the activation input 182 immediately if it receives an indication 171 of a failure of the service brake 170. In an alternative implementation, the delay stage 181 may be receiving a signal from an accelerometer or speedometer, so as to enable better informed decision-making as to when the parking brake 120 is to be activated.

For purposes of checking the satisfactory functioning of the evacuation valves 140, 150, a self-test may include:
1. Pressurize the brake circuit 110 using the APM 111. Preferably engage service brake 170 to keep the vehicle from rolling.
2. Energize only the first solenoid 141 and verify that the pressure in the brake circuit 110 drops at the expected rate and/or to a level below the threshold pressure at which the parking brake 120 becomes engaged.
3. Repeat step 2 for the second solenoid 151 and any further solenoids.

An unsuccessful completion of the self-test may indicate that the brake system 100 currently does not operate with the full redundancy. The self-test may be carried out periodically with respect to any of time, driving time, driving distance. Alternatively, the self-test is triggered by predefined events, such as engine start, driver change, refueling, axle load increase.

Figure 2:
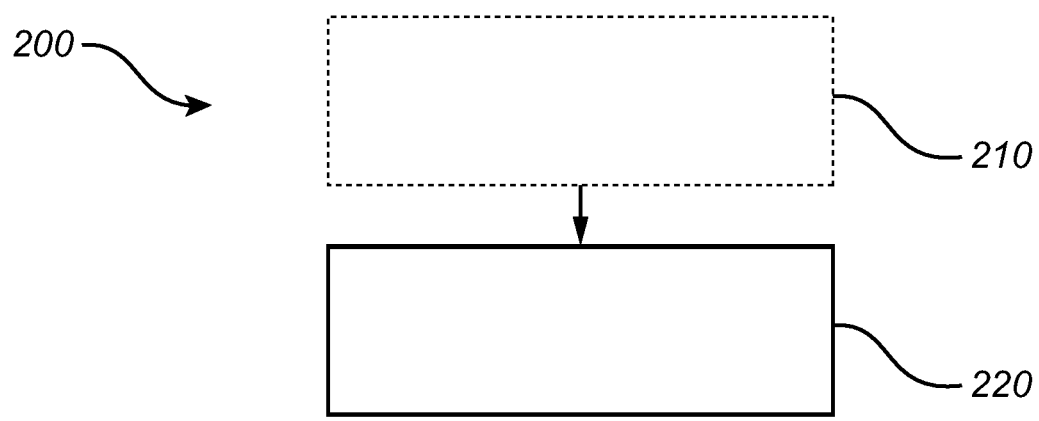
FIG. 2 is a flowchart of a method for engaging a parking brake.

FIG. 2 illustrates a method 200 for engaging a pneumatically or hydraulically controlled parking brake 120. The method 200 may be implemented in the emergency stop controller 180 illustrated in FIG. 1. In particular, the method 200 may be expressed as computer-readable instructions in software, which may be stored and/or distributed as a computer program or a computer-readable medium storing such computer-readable instructions. It is appreciated that computer-readable media may include volatile and non-volatile media, including magnetic, electric, optical and solid-state storage media. Computer-readable media may further include transitory (e.g., a modulated electromagnetic wave) and non-transitory media.

The method 200 includes a step 220 of applying a control signal to at least two evacuation valves, wherein each evacuation valve is configured to evacuate pressurized brake fluid from a brake circuit in response to said control signal. These actions may be triggered by receiving an activation input which is pre-agreed or pre-specified to represent an order for an emergency stop of the vehicle.

The step 220 may be preceded by an optional initial step 210 of allowing a predetermined delay (e.g., 2 seconds) to elapse from receiving the activation input. During the delay, an emergency stop using a service brake of the vehicle may be attempted.

It is to be understood that the present invention is not limited to the embodiments described above and illustrated in the drawings; rather, the skilled person will recognize that many changes and modifications may be made within the scope of the appended claims.

The invention claimed is:
1. A brake system in a vehicle, comprising:
a brake circuit arranged to contain pressurized brake fluid;
a parking brake acting on at least one wheel of the vehicle, the parking brake connected to the brake circuit and configured to be engaged when the pressure in the brake circuit is below a threshold pressure;
at least two evacuation valves, each configured to evacuate pressurized brake fluid from the brake circuit in response to a control signal, for thereby engaging the parking brake;
an emergency stop controller configured to generate said control signal to the evacuation valves, the emergency stop controller is configured to receive an activation input ordering an emergency stop of the vehicle and after a predetermined delay from receipt of the activation input, set the control signal to an active state.

2. The brake system of claim 1, wherein:
the evacuation valves are supplied with a common control signal; and
each evacuation valve operates independently of the other evacuation valve(s) in response to the control signal.

3. The brake system of claim 1, wherein each of the evacuation valves is actuated by a respective solenoid, wherein an energized state of the solenoid corresponds to an open state of the evacuation valve.

4. The brake system of claim 1, wherein each of the evacuation valves is actuated by a respective solenoid, wherein an energized state of the solenoid corresponds to a closed state of the evacuation valve.

5. The brake system of claim 3, wherein the control signal is a winding current of the solenoids.

6. The brake system of claim 5, wherein a common winding current is applied to all solenoids and is drained from each solenoid via a respective ground connection line.

7. The brake system of claim 1, wherein the emergency stop controller is further configured to activate a service brake of the vehicle upon receipt of the activation input.

8. The brake system of claim 1, wherein the emergency stop controller comprises an override mechanism configured to apply a zero delay in response to receiving an indication of a service brake failure.

9. The brake system of claim 1, wherein the brake fluid is air.

10. A vehicle comprising the brake system of claim 1.

11. The vehicle of claim 10, which is an autonomous vehicle.

12. A method of engaging a parking brake acting on at least one wheel of a vehicle, wherein the parking brake is connected to a brake circuit and is configured to be engaged when the pressure of brake fluid contained in the brake circuit is below a threshold pressure, the method comprising:
allowing a predetermined delay to elapse from receipt of an activation input ordering an emergency stop of the vehicle; and
applying a control signal to at least two evacuation valves, each configured to evacuate pressurized brake fluid from the brake circuit in response to said control signal.

13. The method of claim 12, implemented in an emergency stop controller of the vehicle.

* * * * *